United States Patent [19]
Hellinga et al.

[11] Patent Number: 5,982,126
[45] Date of Patent: *Nov. 9, 1999

[54] POWER CLOSURE PANEL CONTROL APPARATUS

[75] Inventors: Richard Hellinga, Kitchener; Robert Lankin, Newton; Brad Watson, Sharon, all of Canada

[73] Assignees: Multimatic, Inc, Markham; Agile Systems, Inc., Waterloo

[ * ] Notice: This patent issued on a continued prosecution application filed under 37 CFR 1.53(d), and is subject to the twenty year patent term provisions of 35 U.S.C. 154(a)(2).

[21] Appl. No.: 08/566,539

[22] Filed: Dec. 4, 1995

[51] Int. Cl.⁶ .................................................... G05B 5/00
[52] U.S. Cl. ...................... 318/468; 318/449; 318/466; 318/488; 318/286; 318/434; 49/28
[58] Field of Search ..................................... 318/466–469, 318/445–489, 280–300; 49/26–28, 360

[56] References Cited

U.S. PATENT DOCUMENTS

| | | | |
|---|---|---|---|
| 4,638,433 | 1/1987 | Schlinder | 318/264 |
| 4,831,509 | 5/1989 | Jones et al. | 318/266 |
| 4,887,390 | 12/1989 | Boyko et al. | 49/214 |
| 5,027,552 | 7/1991 | Miller et al. | 49/27 |
| 5,069,000 | 12/1991 | Zuckerman | 49/28 |
| 5,278,480 | 1/1994 | Murray | 318/626 |
| 5,389,920 | 2/1995 | DeLand et al. | 340/825.69 |

*Primary Examiner*—David Martin
*Attorney, Agent, or Firm*—Borden & Elliot

[57] ABSTRACT

A power closure panel control apparatus is independent of closure panel configuration and capable of a diverse range of remote and direct activation. Sophisticated safety features utilize an adaptive strategy to facilitate highly sensitive obstruction detection by learning the closure system's force requirement and applying a safety margin to it. The control system allows the closure panel to operate in a totally manual mode.

19 Claims, 9 Drawing Sheets

MEMORY STORAGE - 9

Force Measurements

| door position | 1 | 2 | 3 | 4 | 5 | 6 | 7 | 8 | 9 | 10 |
|---|---|---|---|---|---|---|---|---|---|---|
| open | 35 | 36 | 37 | 39 | 44 | 47 | 50 | 55 | 50 | 50 |
| close | 45 | 48 | 55 | 57 | 65 | 78 | 70 | 75 | 65 | 60 |

Time Derivative of Actuation Force Measurements

| door position | 1 | 2 | 3 | 4 | 5 | 6 | 7 | 8 | 9 | 10 |
|---|---|---|---|---|---|---|---|---|---|---|
| open | 23 | 25 | 21 | 17 | 28 | 33 | 45 | 49 | 35 | 17 |
| close | 110 | 47 | 33 | 47 | 50 | 67 | 62 | 56 | 37 | 28 |

Variation of Actuation Force Measurements

| door position | 1 | 2 | 3 | 4 | 5 | 6 | 7 | 8 | 9 | 10 |
|---|---|---|---|---|---|---|---|---|---|---|
| open | 3 | 4 | 3 | 2 | 4 | 3 | 4 | 3 | 2 | 4 |
| close | 9 | 8 | 12 | 18 | 14 | 7 | 6 | 9 | 6 | 4 |

Variation of Time Derivative Measurements

| door position | 1 | 2 | 3 | 4 | 5 | 6 | 7 | 8 | 9 | 10 |
|---|---|---|---|---|---|---|---|---|---|---|
| open | 12 | 13 | 14 | 11 | 13 | 14 | 10 | 14 | 11 | 12 |
| close | 7 | 7 | 7 | 8 | 25 | 12 | 21 | 28 | 14 | 8 |

FIG. 7C

POWER CLOSURE PANEL CONTROL APPARATUS

BACKGROUND OF THE INVENTION

1. Field of the Invention

The invention relates to a power closure control apparatus which is independent of closure panel configuration and capable of a diverse range of remote and direct actuation. It is particularly useful in automotive applications.

2. Discussion of the Prior Art

Automatic closure of doors and miscellaneous panels is a generally accepted practice and is widely used in the architectural industry. Power garage doors, elevator doors, and secure area (e.g. computer room) sliding panels have been in use for a number of decades. The control and safety features of these systems are generally fairly simple but normally of adequate effectiveness.

More recently, powered movement of vehicle closures has become quite popular with windows, decklids, sliding doors and liftgates all being automated. However, the forces required to close and hold these types of systems effectively against aerodynamic and safety related loadings is significantly higher than those encountered in architectural applications. Additionally, the majority of automotive closure applications are geometrically non-linear, and require sophisticated mechanisms to automate. The inherently large operating forces and complex non-linear motions of such closures result in potentially serious safety concerns as simple obstruction detection systems become completely inadequate. In addition to the safety considerations, automotive systems require higher levels of functionality than their architectural counterparts. Various types of sophisticated remote actuation, final latching co-ordination, and crashworthiness must all be considered.

The most common form of obstruction detection system monitors the speed of the panel during opening and closing operation. When the speed falls below some predetermined limit, it is assumed to be due to an obstruction. When an obstruction is in the path of the closure panel, the force required to move the panel increases. The actuator attempts to supply this additional force but because the system is not stiff, the panel movement slows. A more direct means of detecting an obstruction would be to monitor the force required to move the panel. Existing systems do not use this approach because it is usually more costly to monitor force.

Most speed sensing obstruction detection systems depend on a constant speed throughout the closure panel travel (as illustrated for example in U.S. Pat. No. 4,980,618). If the dynamics of the system are such that the speed is not constant, a fixed speed setpoint is inadequate because it allows too large a speed margin during the most rapid and hence most dangerous portion of closure panel movement. Variations to minimize this speed margin are known. It is known, as disclosed by Schindler in U.S. Pat. No. 4,638,433, that a system can be operated in a "learning mode" where, during system installation, the system is operated and determines the limits automatically. This is still a fixed limit and while it eliminates manually setting the limits, still requires the system to be "retrained" in the event the system characteristics change through, for example, regular wear and tear. Jones et al. (U.S. Pat. No. 4,831,509) improves the sensitivity by "mapping" the motor speed throughout the travel of the panel during a "learning mode". This system also requires "retraining" although it is an improvement. Murray (U.S. Pat. No. 5,278,480) improves on this motion by modifying a lower speed limit each time the panel is successfully closed and increases the sensitivity during the last several inches of travel by "mapping" the motor speed for each revolution. However, this approach is still only appropriate for systems which are not stiff, do not change stiffness with time or conditions, are linear throughout closure panel travel, and for which the force experienced by the obstruction need not be known. Further, all the systems described so far assume that the systems do not change from one operation to the next. In non-stationary systems (ships, automobiles, etc.) this is clearly not the case. For example, a sliding door which must be closed on an incline will close more slowly (or quickly) than on the level.

Perhaps the most serious problem with all speed sensing systems is the assumption that unobstructed movement operates at a similar speed over time, temperature, power source variations and other conditions. In the case of battery powered systems such as seen on automobiles, power source variations in excess of +/−50% are not unusual. Further, depending on the technology, DC motor speed will vary proportionally. Thus any system which relies on a constant unobstructed speed is inappropriate for automobile use.

For mechanically efficient DC systems, motor current is a good approximation of the force applied to a closure panel. Using this notion, Vrabel (U.S. Pat. No. 4,678,975) discloses a method more appropriate for automotive use. His system monitors motor current and operating time. If either of these exceed some pre-determined limit, it is assumed to be due to some obstruction. Goertler (U.S. Pat. No. 4,347,465) discloses a variation which assumes an obstruction is detected if the instantaneous current is above some predetermined level or if the current is above some different predetermined level for some predetermined length of time. However, in both these systems, to account for normal variations with time, environmental conditions and normal wear and tear, these limits must allow a generous margin above normal operation and hence result in excessive forces being experienced by obstructions.

Others have made improvements by explicitly compensating for some variation in environmental condition by explicitly measuring them. For example, Mintz (U.S. Pat. No. 4,220,900) discloses a system which monitors motor current and compares it to a preset limit, as does Vrabel. However, he improves on the system by adjusting the limit as a function of temperature. While this addresses temperature dependencies, it does not address any other environmental or system effects.

Zuckerman (U.S. Pat. No. 5,069,000) is able to reduce these generous margins without compensating for the impact of specific factors. He discloses a system which monitors the instantaneous current in the driving motor (which is a good approximation to closure force for mechanically efficient systems) and compares it to the time average of the current. If the difference exceeds a preset limit, it is assumed to be due to an obstruction. While this is more appropriate for battery powered systems, it ignores system non-linearities and provides no obstruction detection during the first portion of operation. Further, it is inappropriate for systems in which motor current is not an accurate measure of closure forces.

Another form of obstruction detection is often used for "stiff" systems (that is, systems which can supply dangerous forces without slowing). In this case, obstructions are sensed using "light curtains" or some variation thereof. In such a system, a beam of light is shone across the path of travel of the panel. If the beam of light is broken, the system assumes an obstruction is in the path of the closure panel. The advantage of this system is that no contact with the obstruction is necessary to detect the obstruction. However, the beam of light cannot cover the entire edge of the closure panel or other surfaces of the panel and hence cannot be relied on exclusively for obstruction detection. Further, such systems are prone to malfunction due to dirt and other foreign matter.

Another form of obstruction detection is a pressure sensitive strip on the leading edge of the closure panel. In some applications this is appropriate, but the pressure sensing strip is prone to breakage, is difficult to seal against, and does not protect against obstructions which do not directly contact the strip.

Other forms of obstruction detection (for example, as described in U.S. Pat. No. 4,039,222) rely on mechanical means such as slip clutches, springs and pressure release valves. These uniformly suffer from inaccuracy, tuning difficulty and the inability to respond to changing environmental or system conditions.

The prior art systems disclosed also vary in their response to an obstruction. All respond by either stopping the actuator or reversing the direction of the closure panel. The problem with simply stopping the actuator is that a force may continue to be applied to the obstruction due to the "spring" in the overall system; that is, the obstruction may be "pinched" between the closure plane and the perimeter of the opening or some other stationary object. The difficulty in reversing the direction of the closure panel is that the obstruction may continue to be pinched or another obstruction may be detected. In the case of a second obstruction, it is unclear what evasive action should be taken.

GENERAL DESCRIPTION OF THE INVENTION

The power closure panel control apparatus described herein effectively solves all of these problems of the prior art in a relatively simple and cost effective manner. Although directed to complex, powered vehicle closures, the apparatus can be employed with architectural, aircraft or other forms of automatic powered closure control systems. The apparatus is independent of closure panel configuration and is equally effective on sliding, simple pivoting, or complex motion panels. It is capable of a diverse range of remote and direct actuation including: touch start, key fob type remote open/close, button open/close from any location, and standard handle actuation. The system facilitates co-ordination between two or more motion systems (e.g. powered hinges/power latch, powered struts/power latch, etc.). The safety features of the apparatus are extremely sophisticated, utilizing an adaptive strategy to facilitate highly sensitive obstruction detection while compensating for build variation, non-linear force requirements, and temperature dependencies. This adaptive strategy effectively "learns" the closure system's force requirement at every point along the path of the panel and applies a safety margin to it. Finally, the control system allows the closure panel to operate in a totally manual mode if the power apparatus is disabled.

Accordingly, the present invention relates to a closure panel control apparatus comprising a panel adapted to move along a predetermined path to cover an opening; control means comprising a memory in which is stored information respecting the force requirement to open or close the panel at each point along the predetermined path; first actuator means controlled by the control means for moving the panel along the predetermined path between an open position and a closed or nearly closed position; optional engagement means for engaging or disengaging the first actuator to the panel; optional second actuator means for moving the panel from a nearly closed position to a fully closed position; optional latch means to hold the panel in the fully closed position or to release the panel; and optional locking means to open or close the latch means.

In a further aspect of the invention, the first actuator means is caused to initiate movement of the panel by means of one or more of the following: an electrical signal; a radio frequency signal; an infra red signal; a physical movement of the panel.

In a further aspect of the invention, there is provided means to detect obstructions in the path of the panel and means to signal the control means to stop, reverse, or "free" the movement of the panel. "Freeing" the panel means that all active forces are removed from the panel and it becomes free to move without the restriction of any actuating means.

In a further aspect of the invention, there is provided means to measure the actuation force applied to the panel; means to measure the panel position; further optional means to measure temperature; memory means for storing values derived from actuation force measurement means and optional temperature measurement means with respect to panel position values from panel position measurement means; and calculating means which operates on values from the measuring means and the memory means.

In a further aspect of the invention, calculation means are provided for continuously varying the information respecting the force required to open or close the panel at each point along the predetermined path, in accordance with measurements taken during the opening and closing of the panel.

In a further aspect of the invention, the means to detect obstructions comprises: means to calculate force, means to calculate the first derivative of the force, and comparison means to compare a combination of the force and first derivative to a reference which is a function of panel position and is stored in memory means.

In a further aspect of the invention, the comparison means depends on the deviation of values derived from the force measurement means as a function of panel position as stored in the memory means.

In a further aspect of the invention, the latch means may be activated to release the panel by means of one or more of mechanical means or electrical signals.

In a further aspect of the invention, the mechanical means comprises a handle.

In a further aspect of the invention, there is provided means to override the automatic motion of the panel to permit the panel to remain partly open.

In a further aspect of the invention, there is provided means to limit initiation of movement of the panel in the case of physical movement of the panel of less than a defined minimum threshold movement.

In a further aspect of the invention, there is provided a closure panel control apparatus comprising a panel adapted to move along a predetermined path to cover an opening; control means comprising a memory in which is stored information respecting the force required to open or close the panel at each point along the predetermined path; first actuator means controlled by the control means for moving the panel along the predetermined path between an open position and a nearly closed position; calculation means for continuously varying the information respecting the force required to open or close the panel at each point along the predetermined path, in accordance with measurements taken during the opening and closing of the panel; and means to detect obstructions in the path of the panel and to signal the control means to stop movement of the panel.

BRIEF DESCRIPTION OF THE DRAWINGS

The invention will be described in greater detail with reference to the accompanying drawings which describe an illustrative embodiment of the invention, and wherein.

DESCRIPTION OF THE ILLUSTRATIVE EMBODIMENT

Figure 1:
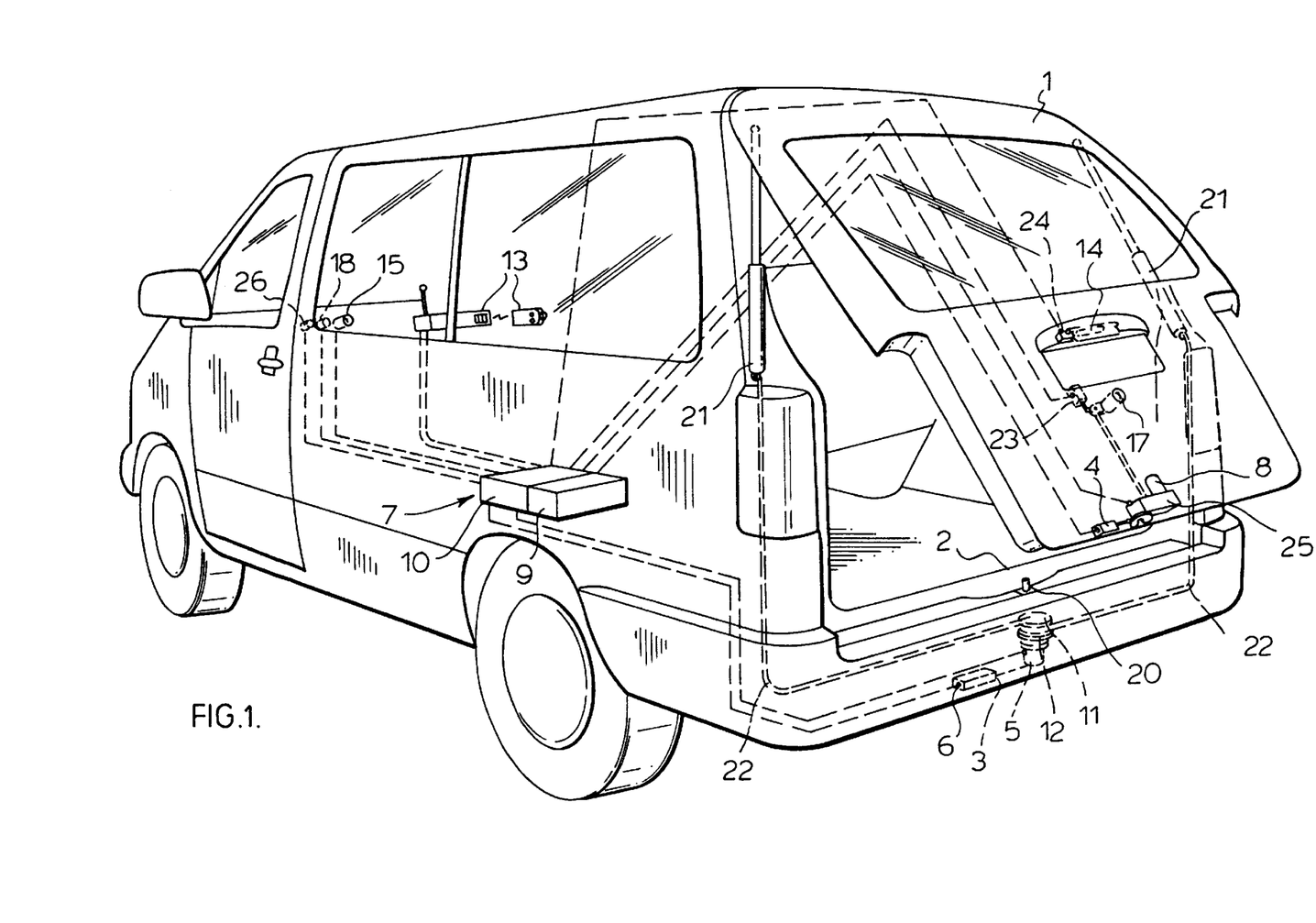
FIG. 1 is schematic perspective representation of an embodiment of the invention showing a closure panel at the rear of a passenger van.
Figure 2A:
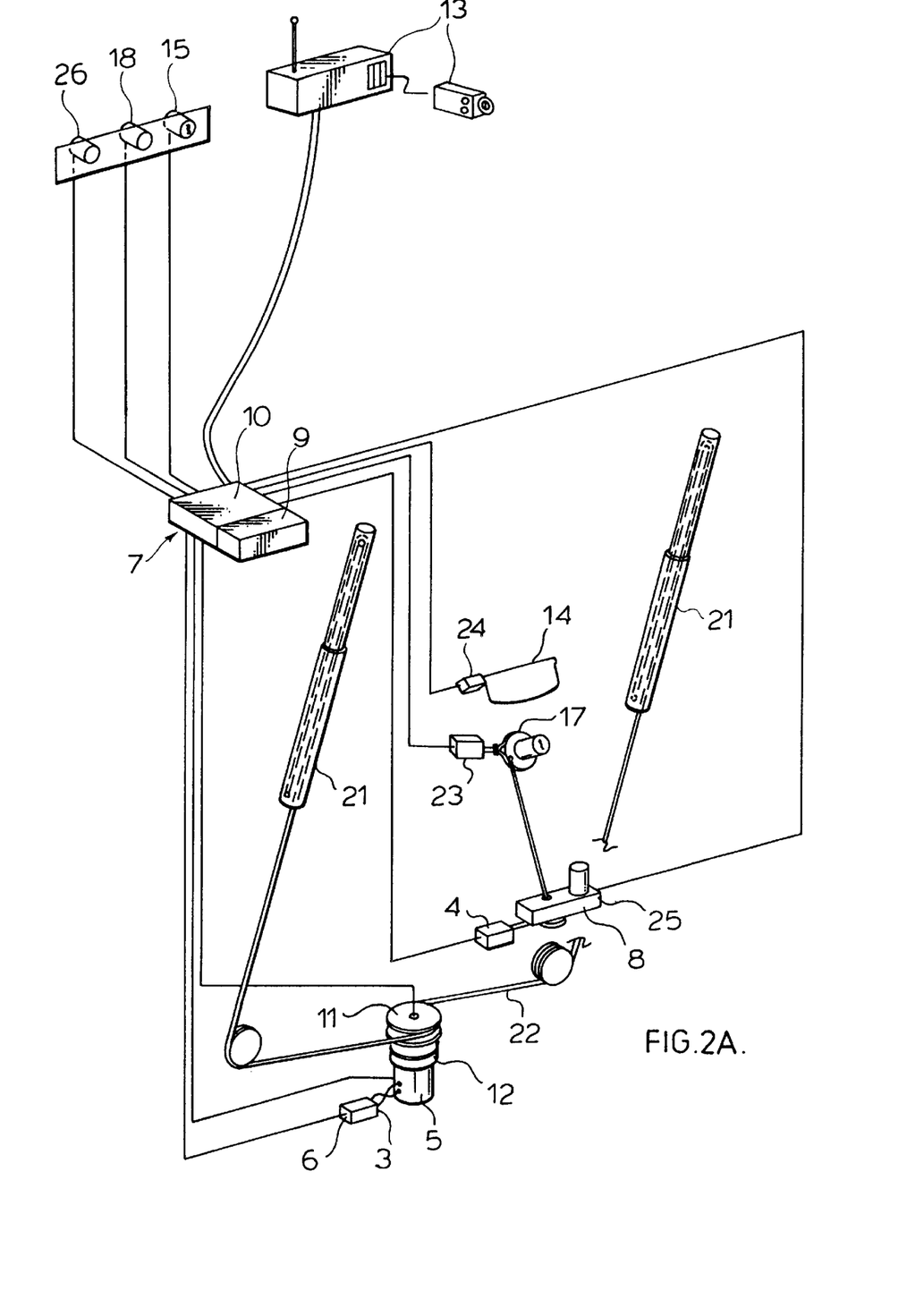
FIG. 2A is a detailed schematic representation of certain components of an embodiment of the invention.
Figure 2B:
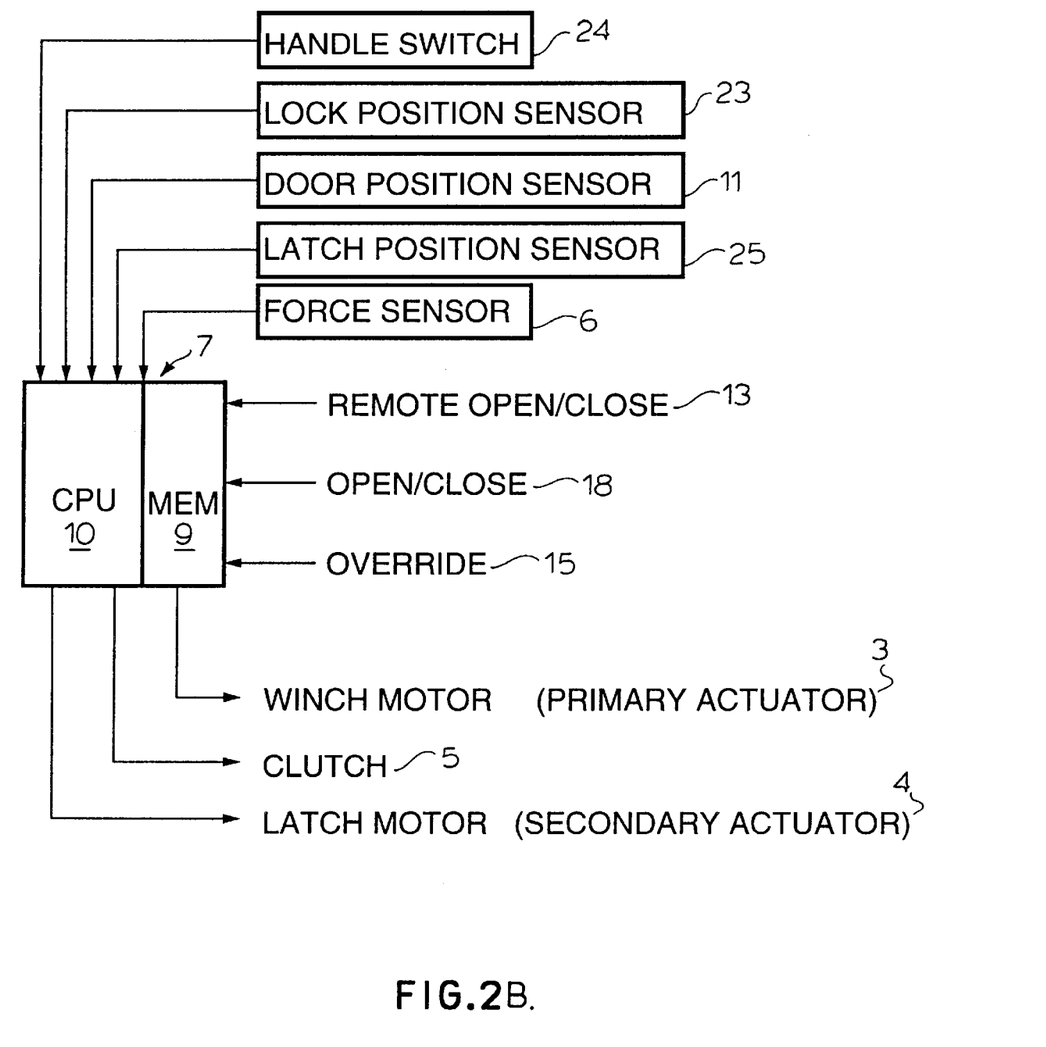
FIG. 2B is a functional schematic representation of certain components of an embodiment of the invention.

Referring to FIGS. 1, 2A and 2B, a panel 1 is used to seal an opening 2 and can be moved along a pre-determined path to unseal the opening. A primary actuating means 5 connects through an engagement apparatus 12 such as a clutch, through a panel movement mechanism 11 to the panel 1.

Referring to FIG. 1, the panel 1 is the rear liftgate of a van which opens about a hinge at the top of the liftgate. Two gas struts 21, one on each of the left and right sides, stretch between a point on the liftgate and the van body. The struts provide a bias force which in the absence of an actuating force causes the liftgate to move to the open position. In the illustrative embodiment, the primary actuating means is a permanent magnet electric DC motor 5. A clutch 5 (the engagement apparatus) connects the motor to a take-up drum 11 (the panel movement mechanism) around which two cables 22 are wound. The cables are routed through sheaths to the right and left struts in a manner such that moving the cables towards the drum causes the struts to compress and the liftgate to move in the closing direction. Rotating the take-up drum 11 in a direction to increase the cable around the drum then moves the liftgate in a closing direction. Rotating the take-up drum in a direction to decrease the cable around the drum allows the struts 21 to move the liftgate 1 in an opening direction. Thus, without excluding fully "active" actuation, this embodiment shows a panel which is opened "passively" by the strut forces and closed "actively" by the actuating means. However, the particular embodiment of the panel movement mechanism is not restricted and it may take any suitable form.

In the illustrative embodiment, the primary actuating means 3, in conjunction with the gas struts 21, can move the liftgate 1 in the closing or opening direction. Releasing the clutch 5 allows the liftgate 1 to be moved by the struts. The force provided by these gas struts is the minimum required to reliably open the liftgate under all required conditions of temperature, liftgate mass (with snow accumulation and optional equipment) and over the life of the vehicle. As such, the force is sufficiently small that the liftgate can be operated manually when the clutch is disengaged. The clutch has two major purposes: it allows manual operation of the closure panel and it provides a safe strategy to deal with obstructions. Releasing the clutch removes actuation forces and results in a safe situation. This is preferred over stopping or reversing the closure panel.

The panel location sensing means of the illustrative embodiment consists of notches around the perimeter of the take-up drum 11 whose movement can be sensed using a Hall effect proximity sensor (not shown). By counting the number of notches passing by the sensor and noting their direction, the relative movement of the liftgate is measured. By "calibrating" the liftgate position, the absolute position of the liftgate may be known. This calibration is achieved during initial operation by opening the liftgate until there is no longer any movement and considering this the fully open position, and then closing the liftgate until the actuation force exceeds some predetermined limit and considering this the fully closed position. If the distance between the considered open and considered closed positions are within predetermined bounds, the closed position is considered zero (0) and all further detected movement of the liftgate is considered relative to this point. Periodic calibration during normal operation may be performed if required.

Alternatives to the illustrative embodiment of the panel location sensing means are dependent on the panel movement mechanism and include known position measurement techniques such as use of Linear Variable Displacement Transducers, resistive and optical techniques, as well as motion measurement techniques such as tachometers, servo motor pulses, and flow measurement devices when the panel movement mechanism uses a liquid to transmit force.

In the illustrative embodiment, the primary actuator motor current 6 is a good measure of actuating force on the panel. Alternatives include pressure transducers and deflection measurements on a deflecting element.

A secondary actuating means 4 is incorporated into the illustrative embodiment and operates an electromechanical latch 8, familiar to those skilled in the art, for two reasons. First, in the automotive field, it is a requirement that doors are able to withstand significant forces (typically 4000 lbs) before unintentional opening. This is traditionally achieved through the use of a latch, which uses a mechanical structure to prevent a striker pin 20 from leaving the latch without the release of this mechanical structure. While it is possible to provide a primary actuating means to withstand these forces, it is unnecessary and not cost effective. Secondly, doors and other closure panels must be sealed against the elements. A compressible seal is typically used which requires significant compressive forces. To require the primary actuating means to compress the weather seal in the illustrative embodiment would require a significantly larger primary actuator, engagement means and panel movement mechanism. For these reasons, a secondary actuator means, or power latch is used. It is an understood extension that the secondary actuator means may involve a plurality of actuators.

The secondary actuating means 25 includes a position sensor 4 to detect one of four latch states: fully closed, fully open, at rest and in secondary latch position. These states are familiar to one versed in the art of automotive latches. The illustrative embodiment includes control means 7, described below, which moves the secondary actuating means 25 from one state to another in a manner which is coordinated with that of the primary actuating means 3 to provide reliable operation.

As in the case of a conventional latch, the illustrative embodiment includes an optional handle 14 which is optionally connected to the latch 8 via some mechanical means in such a manner that operating the handle causes the latch to move to the fully open state and is optionally connected to a switch 24 which indicates to the control means that the handle is being operated.

The latch 8 further operates as a conventional latch in that closing the liftgate with sufficient force as the striker enters the latch mechanism causes the latch mechanism to move from the rest state to the secondary lock position and if the closing force is still further sufficient, from the secondary lock position to the fully locked position and then to the rest position.

A locking mechanism 17 is included in the illustrative embodiment. The locking mechanism is connected to the latch in a manner familiar to those versed in the art. The locking mechanism has two states: locked and unlocked. In the locked state, the handle 14 is prevented from moving the latch 8 to the fully open state. A switch 23 is included in the lock mechanism which indicates to the control means 7 the state of the locking mechanism.

The illustrative embodiment includes control means 7 comprising processing means 10 and memory means 9 which monitors sensing means and responds to operating commands. The control means includes a microcontroller, a memory, interface electronics to convert the sensor signals for use by the microcontroller, and drive electronics which convert microcontroller commands to signals used by the actuating means 5 and 25.

The commands include the following:
1. Open/Close (O/C). This command indicates to the controller that the liftgate should be closed if it is in the open position. Otherwise the liftgate should be opened.
2. Close. This command indicates to the controller that the liftgate should be moved to its closed position.
3. Open. This command indicates to the controller that the liftgate should be moved to its open position.
4. Lock. This command indicates to the controller that the lock mechanism should be moved to its locked state.
5. Unlock. This command indicates to the controller that the lock mechanism should be moved to its unlocked state.
6. Initialize (optional). This indicates to the controller that any values stored in the memory are to be considered uninitialized.
7. Disable. This command indicates to the controller that no actuation means are permitted to respond to a command while the command is active.

The illustrative embodiment includes various means to indicate operating commands to the control means.

The open/close command can be issued using a key fob 13 or a push-button switch 18 in a convenient location.

The close command can be issued by manually moving the liftgate towards its closed position while it is in its open position. If, while the control means 7 is not indicating to the actuating means 5 and 25 that the panel should move, the panel position sensing means indicates to the control means that the panel has moved from the open position towards the closed position more than a predetermined distance, or has moved from the open position towards the closed position at greater than some predetermined speed, the close command is issued.

The open command can be issued via the handle switch by operating the handle 14 when the lock 17 is in the unlocked state.

The lock and unlock commands can be issued using a key fob 13 or push-button switches 26 in convenient locations.

The initialize command can be issued from a push-button switch 26. This switch may also indicate to the controller to issue an open and then close command to complete a learning process. Additionally, when power is initially applied to the controller the initialize command may be issued.

The disable command can be issued from a switch 15 having two stable states ("disable" and "normal operation") in a convenient location. Furthermore, it is an anticipated extension that other vehicle conditions (for example, transmission state is not "park", or speed is greater than 2 kph) will cause the disable command to issue.

FIG. 2B illustrates how the various switches, sensors, actuators and engagement apparatus deliver or receive signals from the computer processor and memory.

Figure 6:
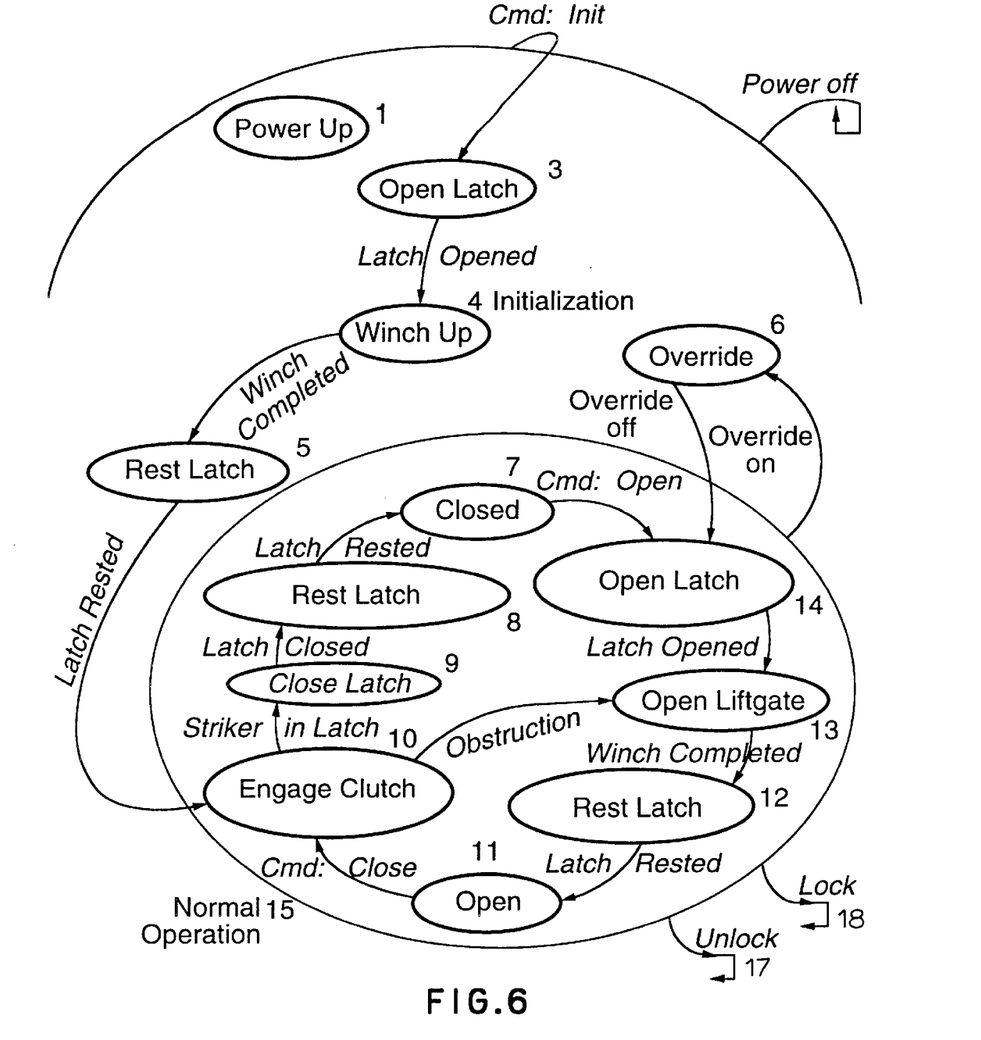
FIG. 6 is a state diagram illustrating various commands and states of the panel closure apparatus of an embodiment of the invention.

FIG. 6 is a state chart which is a convenient form to represent "reactive systems", that is, systems which respond to commands depending on present system state. State charts are similar to finite state diagrams with extensions for embedded controllers. A "bubble" represents a control state. The "arcs" represent the conditions which cause control to move from one state to the next. Bubbles may enclose bubbles (states and sub-states) and arcs from these encompassing states can be considered to come from every sub-state within the encompassing state. Two extensions, for purposes of illustration, are the symbols at 17 and 18, which are conditions and actions performed "in line" with other state transitions. A further extension is that each state is considered to have a transition from itself to itself which is the default condition and performs the action in the bubble. In the illustrative embodiment, state transitions occur every 20 milliseconds.

The following describes how the control means 7 responds to the commands and present state of the panel closure apparatus and coordinates actuator motion as shown in FIG. 6. The numbers used in the following discussion refer to the states illustrated in FIG. 6.

Assume that the liftgate has been operating for some time and is thus in the state of normal operation 15. If at any time during normal operation the disable command is asserted, control enters state 6. In this disable state, all commands are ignored until the disable command is de-asserted. In this illustrative embodiment, control now moves to state 14 and the latch opens, the clutch is engaged and the primary actuator moves the liftgate toward the open position.

If at any time during normal operation 15 the lock command is issued, the lock moves to its locked state 18. If at any time during normal operation the unlock command is issued, the lock moves to its unlocked state 17.

Assume control is in the normal state and the liftgate is now in the closed position 7. If the open command is issued, control moves to state 14 and the controller moves the latch to the open position, engages the clutch and operates the primary actuator to move the liftgate toward the open position. Control leaves state 14 and enters state 13 when the latch reaches its open state. State 13 continues to operate the primary actuator in a direction to cause the liftgate to move towards its open position. When the liftgate reaches its open position, control moves to state 12, the latch is moved towards its rest state, and the clutch is released. When the latch reaches its rest state, control moves to state 11, at which point all activity ceases and the liftgate is in the stable open position.

Assume the liftgate is in the open position, that is, control is in state 11. When the close command is asserted, control moves to state 10 and the primary actuator moves the liftgate towards its closed position. This continues until an obstruction is detected or the liftgate reaches its nearly closed position and the striker causes the latch to move to its secondary latch state. In the case where an obstruction is detected, control moves to state 13 and the primary actuator moves the liftgate towards its open position. Control then continues in state 13 as described above. In the case where the liftgate reaches its nearly closed position with no obstruction detected, control moves to state 9 and the latch is moved towards the closed state. This pulls in the liftgate against the primary seal and provides a robust mechanism against external forces opening the latch. When the latch reaches its closed state, control moves to state 8 and the latch is moved towards the rest state. When the latch reaches the rest state, all activity ceases and the liftgate is in a stable closed position 7.

The foregoing assumes the liftgate has been operating for some time. The following describes the operation of the control means during initial system operation.

When power is applied to the system, control begins in state 1. State 2 encompasses all states. Therefore when the initiating switch 16 is asserted at any time during operation, including the disabled state 6, control moves to state 3. At this point, liftgate location is unknown, and it is unknown if the liftgate striker is captive in the latch. Therefore, the latch is moved toward the open state, all memory information about liftgate movement characteristics is erased, the memory is filled with the "invalid" flag, and the primary actuator is moved to cause the liftgate to move towards the open position. When the latch reaches the open state, control moves to state 4. The primary actuator continues to move the liftgate toward the open position.

When liftgate motion ceases, the liftgate is considered to be in its open position (position is calibrated) and control moves to state 5. At this point the latch is moved towards its rest position. When the latch reaches the rest state, control enters "normal" operation 6 and continues at state 10.

A valuable aspect of the invention includes the structure and method for detecting obstructions. The apparatus and method are described below.

Figure 7A:
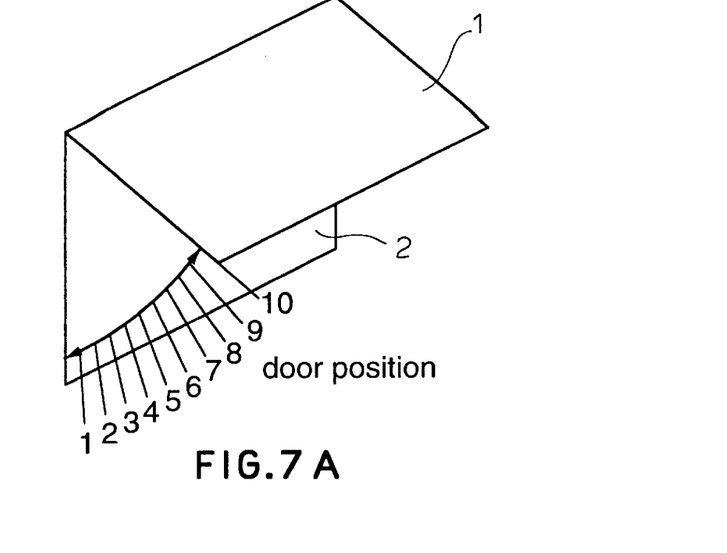
FIG. 7A illustrates selected numeric door positions along the path of travel of a typical panel.
Figure 7B:
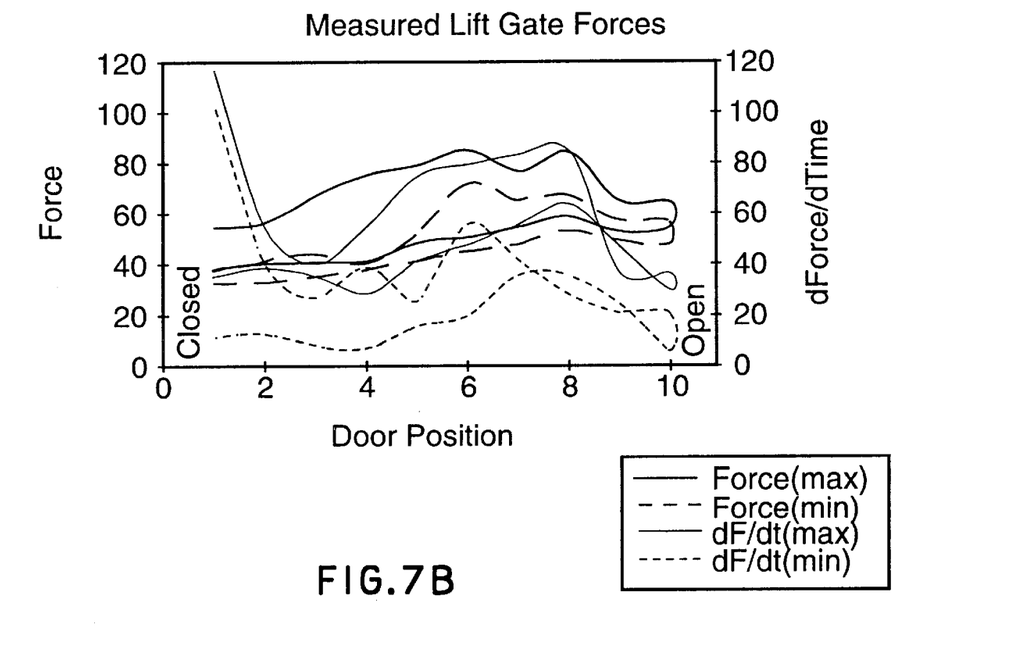
FIG. 7B illustrates representative measured lift gate forces and derivatives thereof over time as a function of door position, for an embodiment of the invention.
Figure 7C:
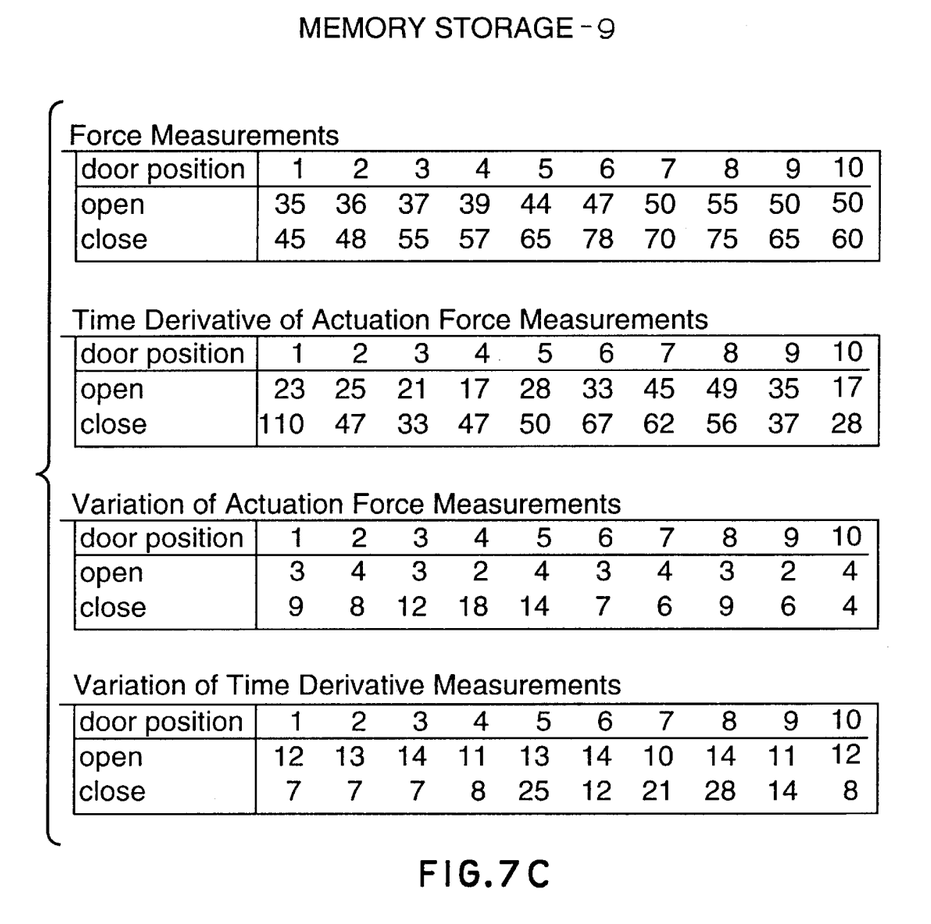
FIG. 7C illustrates four multi-dimensional arrays of memory storage in a typical operating embodiment of the invention.

In the illustrative embodiment, the memory stores information about the actuation force required to close the liftgate at each point of liftgate travel along the predetermined path. FIG. 7A illustrates selected numeric door positions along the path of travel of a typical panel. FIG. 7B illustrates representative measured lift gate forces and derivatives thereof over time as a function of door position, for an embodiment of the invention. FIG. 7C shows the memory and its relation to liftgate travel. Values are stored in four multi-dimensional data tables or arrays. The dimensions of the array are travel direction and position. The travel direction is open or close. The position is some number of divisions of the predetermined path. The first array represents the actuation force (fmem), the second represents the time derivative of the actuation force (dfmem), the third represents the variation of the actuation force measurements (vfmem), and the fourth represents variation of the actuation force-time derivative measurements (vdfmem). Further stored values in memory include the number of liftgate closings and openings without an obstruction detected, the number of obstructions detected, and the average actuating force over the last n minutes.

The following discussion assumes the liftgate is operating. It is now time t, the is liftgate is in division p of its travel along the pre-determined path, and the direction of liftgate travel is d. The values in memory are used to determine an obstruction as follows:

The sensed primary actuator force is compared to the force array at the present liftgate position and direction in a system dependent combination of the following:

the present force (f(d,t)) is larger than the force stored in memory for this liftgate position (fmem[d,p]) by some margin (fmargin (d)).

the present derivative of the force with respect to time (df/dt(d,t)) is larger than the time derivative of the force stored in memory for this liftgate position (dfmem(d,p)) by some margin (dfmargin(d)).

the present force (f(d,t)) is larger than some predetermined absolute maximum force (fmax(d)). This maximum force is a maximum which may not be exceeded under any circumstance.

In the illustrative embodiment, the margin is adjustable. An understood extension of this concept is to make the margins (both fmargin and dfmargin) a function of the vfmem[d,p] and vdfmem[d,p]. That is, the margin itself is a function of position and varies at each position over time as the force varies. If the force at position d,p is the same during each cycle, the margin tends to become smaller and the system more sensitive. If the force at position d,p varies significantly during each cycle, the margin tends to remain large. The margin is limited such that it cannot increase beyond a point and attempts to increase it beyond this point indicates a system problem.

A further extension is to modify the stored forces (either or both of fmem(p) and dfmem(p)) as a function of some external sensor (such as a temperature sensor) to incorporate known and predictable environmental dependencies.

If the arrays contain valid data, while the control means does not detect an obstruction during liftgate movement, the arrays are modified using the formulae set out below:

$$f\text{mem}[d,p] = (k1 \times f(d,p) + k2 \times f\text{mem}[d,p])/k1+k2$$

$$df\text{mem}[d,p] = (k3 \times df/dt(d,p) + k4 \times df\text{mem}[d,p])/k3+k4$$

$$v f\text{mem}[d,p] = (k5 \times (f(d,p) - f\text{mem}[d,p]) + k6 \times v f\text{mem}[d,p])/k5+k6$$

$$vdf\text{mem}[d,p] = (k7 \times (f(d,p) - f\text{mem}[d,p]) + k8 \times v f\text{mem}[d,p])/k7+k8$$

where k1, k2, k3, k4, k5, k6, k7 and k8 are established empirically depending on system dynamics. They affect the speed at which the system learns and hence how responsive the system is to a changing environment. Typically these values will be such that k1, k3, k5 and k7 are much smaller than k2, k4, k6 and k8 respectively.

Variations to the modification formulae include: limiting the maximum change per calculation to some maximum; and adding additional averaging constants (the k parameters) to allow measured values which are lower than the stored values to affect the arrays differently than measured values which are higher than the stored values.

If the stored value is marked as "invalid" because the system has not yet operated, then the formulae are as follows:

$$f\text{mem}[d,p] = f(d,p)$$

$$df\text{mem}[d,p] = df/dt(d,p)$$

vfmem[d,p]=0 vdfmem[d,p]=0

In this way, the system can learn the characteristics of the liftgate immediately after assembly. This allows for significant variations between one product and the next without affecting product performance. If a particular assembly process requires the products to be similar within a certain tolerance, the array values can be seeded in such a way that out of tolerance product will detect an obstruction during the first operation, indicating to quality control personnel that the product is out of tolerance. This technique proves system operation, calibrates the system and tests the mechanical system against predetermined tolerances in one step without the addition of external equipment.

Finally, the control means monitors the average actuator work over some long time (minutes). Should it exceed work specifications for the actuator, the panel becomes inoperative in some safe state (open in the illustrative embodiment). This protects the actuator at no additional system cost.

The effect of this obstruction detection technique is to establish and store a continuously updated normal actuating force for opening and closing the panel. Any significant force required to actuate the panel beyond this normal actuating force is assumed to be due to an obstruction. This technique allows for maximum sensitivity while maintaining reliable operation. Though this invention reduces the likelihood of falsely detecting an obstruction for a given sensitivity, an important feature is the ability to deal with falsely detected obstructions. In the event that unusual circumstances cause increased forces which result in the apparatus assuming an obstruction is present, the learning technique increases the likelihood that repeating the command will result in successfully opening or closing the panel, because the array will store increased forces up to the point the obstruction was assumed.

It should be emphasized that the illustrative embodiment uses a passive opening system. The illustrative embodiment uses gas struts 21 which apply an acceptably small force to an obstruction during liftgate opening and therefore active obstruction detection during liftgate opening is unnecessary. The invention applies to systems with different panel movement mechanisms which may exhibit different characteristics. The state chart may exhibit variations from that presented in FIG. 6, but the fundamental coordination of actuating means in FIG. 6 applies. Further, the method for detecting obstructions described below is equally applicable to systems which actively open and close panels. Additionally the evasive action taken upon detecting an obstruction varies with the panel movement mechanism. Finally, the specific panel movement mechanism may exhibit or respond to temperature or other environmental conditions which are easily modeled and hence compensated for in the obstruction detection algorithm. For example, the gas struts 21 in the illustrative embodiment exhibit a strong and predictable temperature sensitivity. Additional obstruction detection sensitivity may be achieved by scaling the array values according to the present temperature when testing for an obstruction and normalizing the measured values with respect to the present operating temperature when modifying the array values.

ADDITIONAL EMBODIMENTS

It will be obvious that there are modifications to the illustrative embodiment described above which do not deviate from the substance of the invention. A few such examples are cited below.

The illustrative embodiment of FIG. 1 shows a movement mechanism based on cables, winches and gas struts. An alternative embodiment may use an incompressible fluid in conjunction with a pump and linear pneumatic or hydraulic actuators and optionally a compressible gas. In such an embodiment, the force on the panel may be measured by the gas or fluid pressure. Panel position may be inferred from the flow of the incompressible fluid or, as in any embodiment, may be measured directly. In this embodiment, as in others, the opening of the panel may be active or passive.

Figure 3:
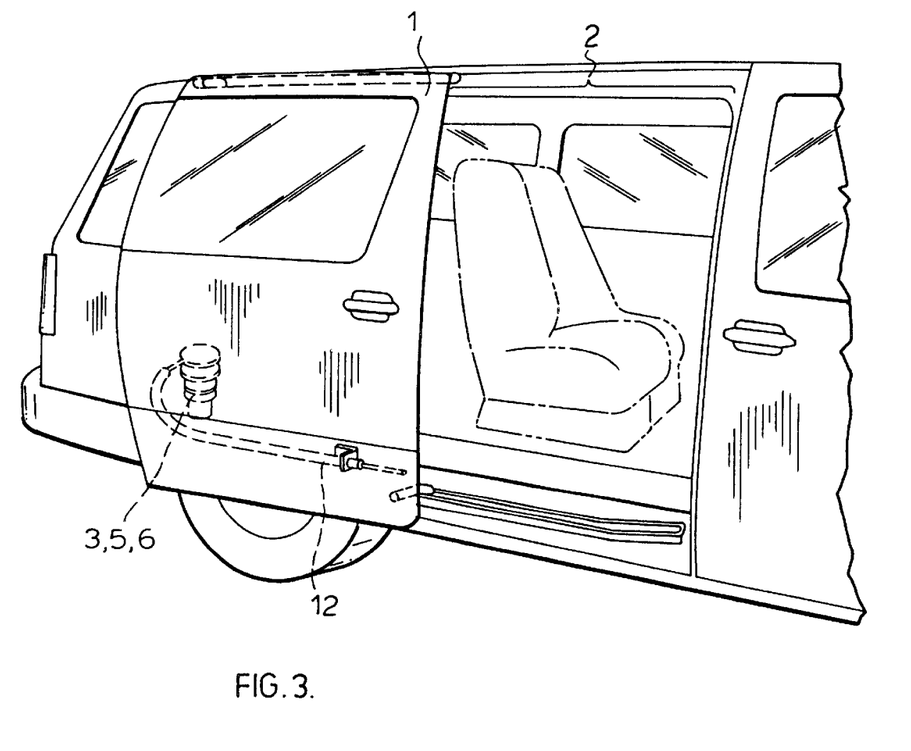
FIG. 3 is a schematic perspective representation of an alternative embodiment of the invention showing a closure panel at the side of a passenger van.

FIG. 3 shows a van in an alternative illustrative embodiment with a power sliding door 1 on the side. The primary actuation means 3, the secondary actuation means 4, the panel movement mechanism 12, the control means 7, the engagement apparatus 5, the position sensor 11, the latch means 8 and the force sensor 6 are shown. The most significant difference in the operation of the control means in FIG. 3 from the illustrative embodiment of FIG. 2 is the active opening of the panel, rather than reliance on, for example, gas struts.

Figure 4A:
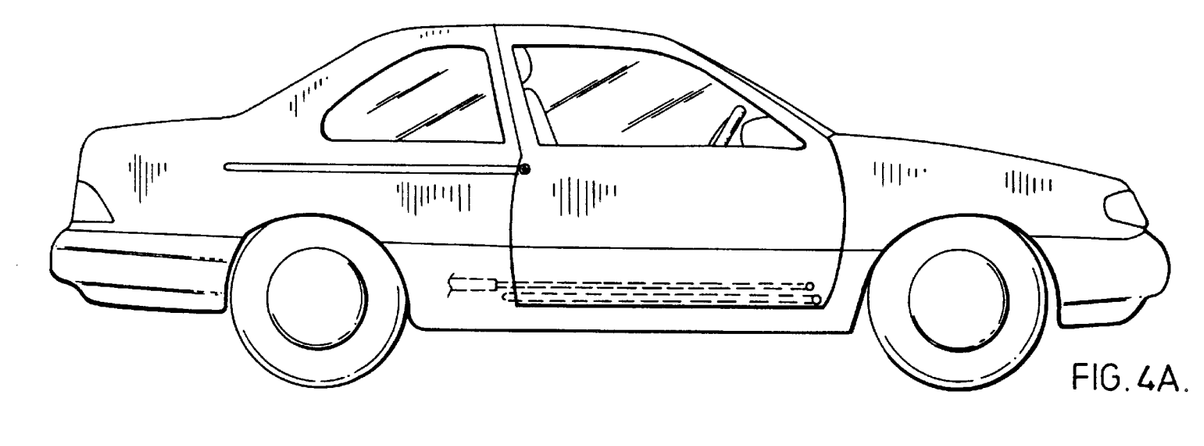
FIG. 4A is a side view of an embodiment of the invention showing a closure panel in the closed position at the side of a typical automobile.
Figure 4B:
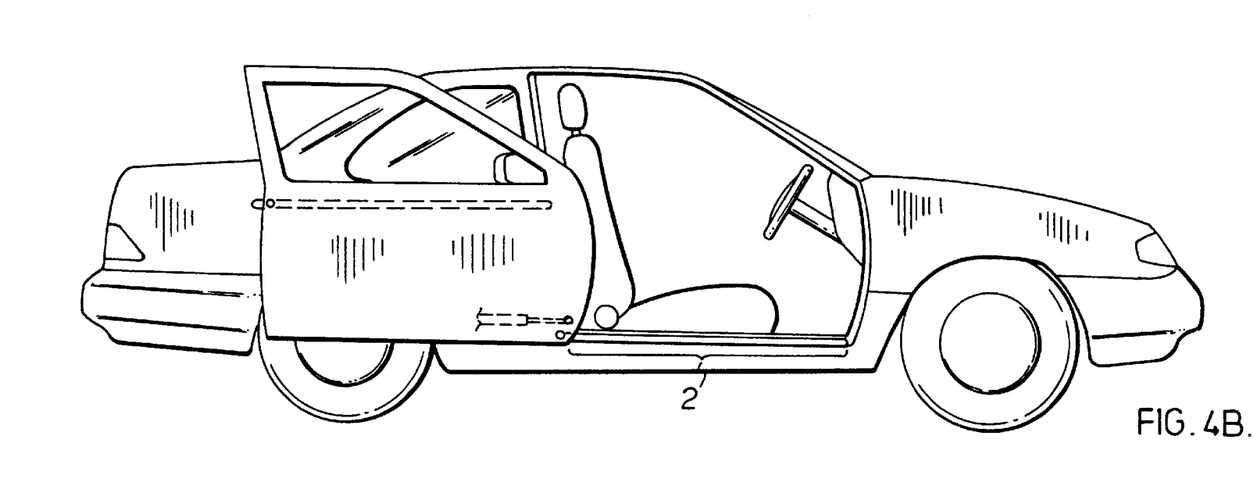
FIG. 4B is the embodiment of FIG. 4A showing the closure panel in the fully open position.

FIGS. 4A and 4B show a car with a similar power sliding door.

Figure 5:
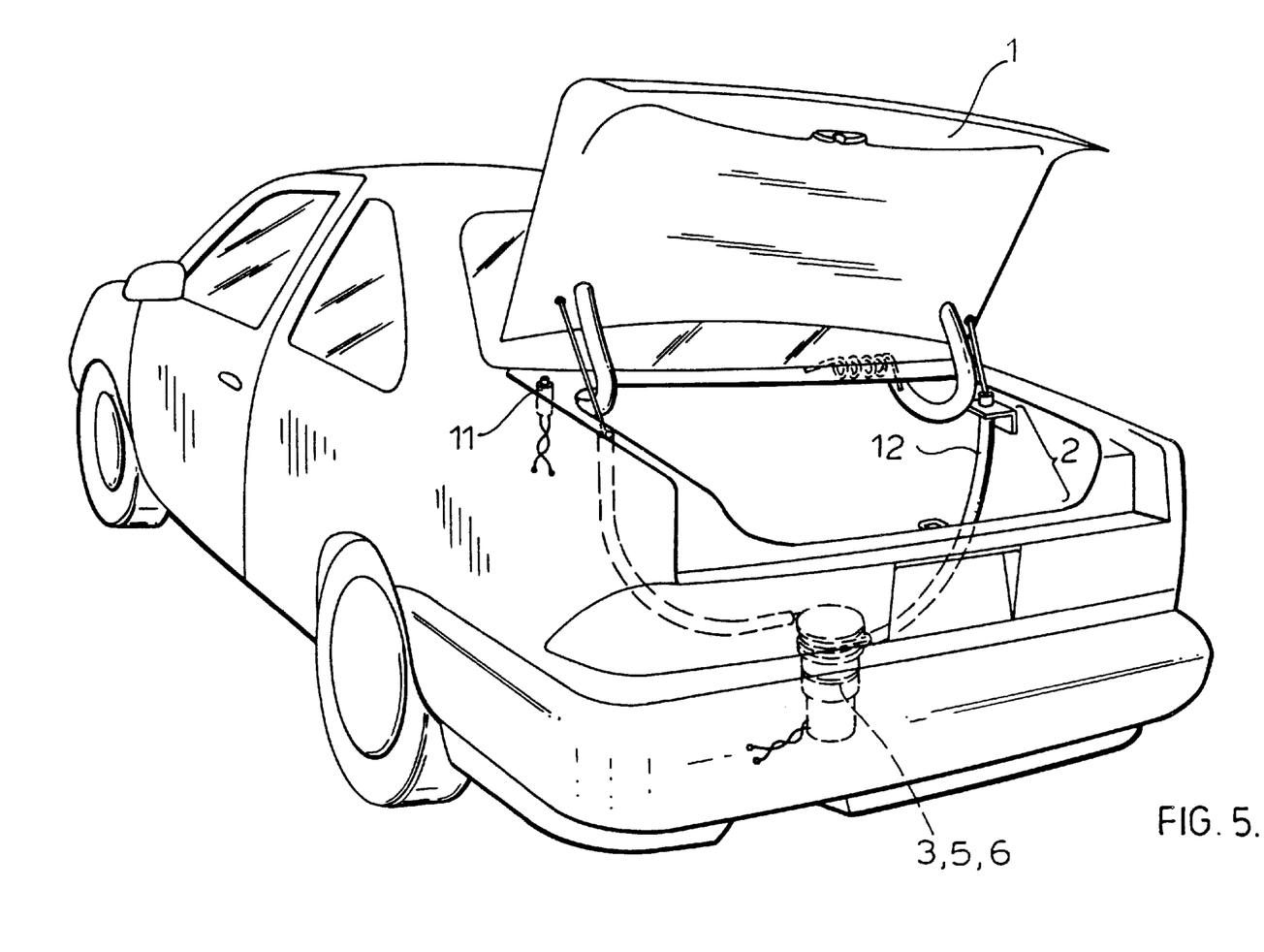
FIG. 5 is a rear perspective representation of an alternative embodiment of the invention showing a closure panel on the trunk of an automobile.

FIG. 5 shows the illustrative embodiment as applied to a car trunk deck lid. The significant difference from the illustrative embodiment of FIG. 2 is the lack of an engagement apparatus.

Further, modifications of the invention described will be obvious to those skilled in the art and may be made without diverting from the substance of the invention claimed.

We claim:

1. A closure panel control apparatus comprising:
   (a) a panel adapted to move along a predetermined path to cover an opening;
   (b) actuator means for moving the panel along the predetermined path between an open position and a closed position;
   (c) sensing means for continuously measuring instantaneous information relating to the force required to open or close the said panel at discrete point along the predetermined path during operation without the use of velocity feedback;
   (d) process means for performing calculated on said measured instantaneous information;
   (e) memory means for storing a table of the calculated information produced by the said processing means;
   (f) control mean for detecting obstruction in the path of the said panel by comparing the said measured instantaneous information with the calculated information stored by the memory means and or directing the actuation means to stop, free or reverse movement of the panel, based on the results of the comparison.

2. The closure panel control apparatus of claim 1 wherein the calculated information produced by said processing means is stored as a function of time.

3. The closure panel control apparatus of claim 1 wherein the calculated information produced by said processing means includes position of the panel.

4. The closure panel control apparatus of claim 1 wherein the calculated information produced by said processing means includes the instantaneous force required to open or close the panel.

5. The closure panel control apparatus of claim 1 wherein the calculated information produced by said processing means includes the first derivative of the instantaneous force required to open or close the panel such force with respect to position.

6. The closure panel control apparatus of claim 1 wherein the calculated information produced by said processing means includes the first derivative of the instantaneous force required to open or close the panel such force with respect to time.

7. The closure panel apparatus of claim 1 wherein the information measured by the said sensing means includes ambient temperature.

8. The closure panel control apparatus of claim 1 wherein the calculated information produced by said processing means includes information related to force required to open or close the panel normalized with respect to ambient temperature.

9. The panel control apparatus of claim 1 wherein the control means compares the instantaneous information relating to the force required to open or close the panel produced by the said processing means to a predetermined and stored maximum value.

10. The closure panel control apparatus of claim 1, wherein the control means allows manual movement of the panel along the predetermined path from an open position to a fully closed position.

11. The closure panel control apparatus of claim 1, wherein the control means allows manual override of the powered motion of the panel to permit the panel to remain partly open.

12. The closure panel control panel of claim 1, further comprising a lock which electrically or mechanically prevents the actuator means from operating.

13. The closure panel control apparatus of claim 1 wherein the actuator means comprising a first actuator means for moving the panel along the predetermined path between an open position and a nearly closed position, a second actuator means for moving the panel from a nearly closed position to a fully closed position, latch means to hold the panel in the fully closed position or to release the panel, and control means capable of coordinating the function of the first and second actuator means and the latch means.

14. The closure panel control apparatus of claim 1, wherein the initiation of movement of the actuator means caused by one or more of:
  (a) an electrical signal;
  (b) a radio frequency signal;
  (c) an infra red signal;
  (d) a physical movement of the panel;
  (e) mechanical means.

15. The closure panel control apparatus of claim 14, wherein the mechanical means comprises a handle.

16. A closure panel control apparatus comprising:
  (a) a panel adapted to move along a predetermined path to cover an opening;
  (b) first actuator means for moving the panel along the predetermined path between an open position and a nearly closed position, second actuator means for moving the panel from a nearly closed position to a fully closed position, latch means to hold the panel in the fully closed position or to release the panel, and control means capable of coordinating the function of the first and second actuator means and latch means;
  (c) sensing means for continuously measuring instantaneous information relating to the force required to open or close the panel wherein such information comprises time, position of the panel at discrete points along the predetermined path during operation, and ambient temperature, without the use of velocity feedback;
  (d) processing means for performing calculations said measured instantaneous information wherein such calculated information comprises the instantaneous force required to open or close the panel, the first derivative of the instantaneous force required to open or close the panel such force with respect to position, the first derivative of the instantaneous force required to open or close the panel such force with respect to the time, the force required to open or close the panel normalized with respect to ambient temperature, and the running average or other statistical cumulation of such calculated information;
  (e) memory means for storing a table of the calculated information produced by the said processing means;
  (f) control means detecting obstructions in the path of the said panel by comparing the said measured instantaneous information with the calculated information stored by the memory means and for directing the actuation means to stop, free or reverse movement of the panel, based on the results of the comparison.

17. The closure panel control apparatus of claim 16 wherein the control means compares the instantaneous information relating to the force required to open or close the panel produced by the said processing means to a predetermined and stored maximum value.

18. The closure panel control apparatus of claim 16, wherein the initiation of movement of the first and second actuator means is caused by one or more of:
  (a) an electrical signal;
  (b) a radio frequency signal;
  (c) an infra red signal;
  (d) a physical movement of the panel;
  (e) mechanical means.

19. The closure panel control apparatus of claims 18, wherein the mechanical means comprises a handle.

\* \* \* \* \*

UNITED STATES PATENT AND TRADEMARK OFFICE
CERTIFICATE OF CORRECTION

PATENT NO.    : 5,982,126
DATED         : November 9, 1999
INVENTOR(S)   : Richard Hellinga et al.

It is certified that error appears in the above-identified patent and that said Letters Patent is hereby corrected as shown below:

Column 10,
Line 5, delete "is" (second occurrence).

Column 12,
Line 40, change "point" to -- points --;
Line 43, change "calculated" to -- calculations --;
Line 47, change "mean" to -- means --; change "obstruction" to -- obstructions --;
Line 50, change "or" to -- for --;

Column 13,
Line 6, after "panel" insert -- control --;
Line 14, after "The" (first occurrence) insert -- closure --;
Line 27, change "panel" (second occurrence) to -- apparatus --;
Line 31, change "comprising" to -- comprises --.
Line 41, before "caused" insert -- is --;

Column 14,
Line 11, change "wherein" to -- where --;
Line 15, after "calculations" insert -- on --;
Line 30, after "means" insert -- for --;

Signed and Sealed this

Fifteenth Day of October, 2002

*Attest:*

*Attesting Officer*

JAMES E. ROGAN
*Director of the United States Patent and Trademark Office*